July 28, 1964  A. BLANCHARD  3,142,145
METHOD AND APPARATUS FOR FORMING CABLES
Filed Jan. 28, 1963  2 Sheets-Sheet 2
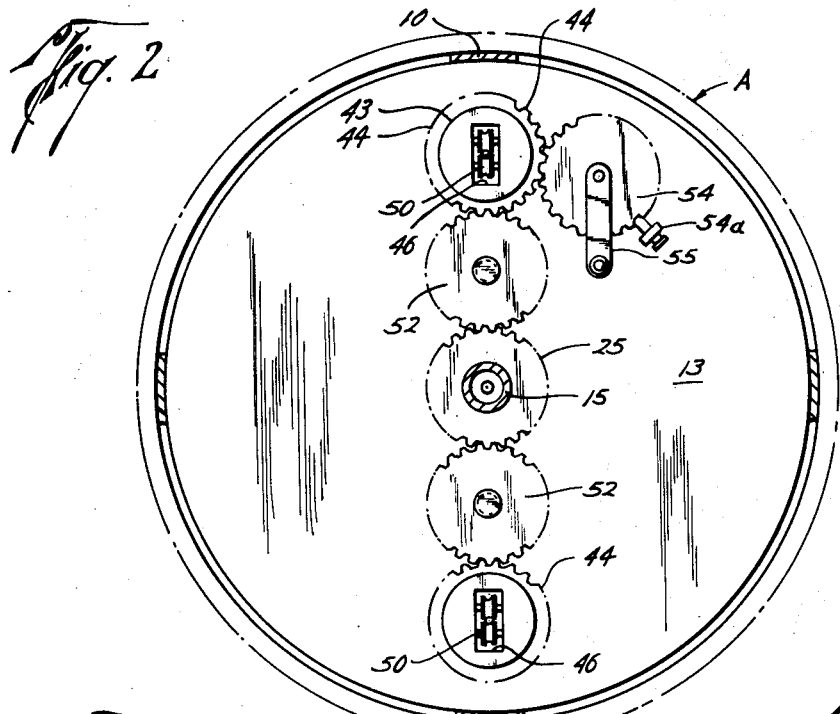
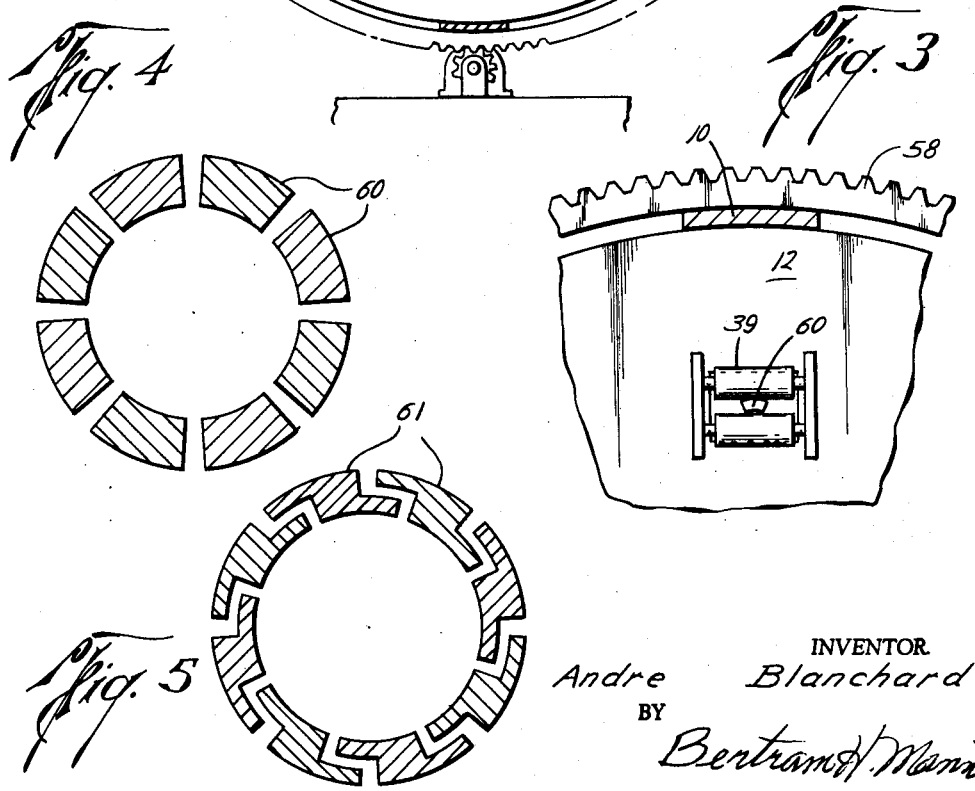
INVENTOR.
Andre Blanchard
BY
Bertram H. Mann
ATTORNEY

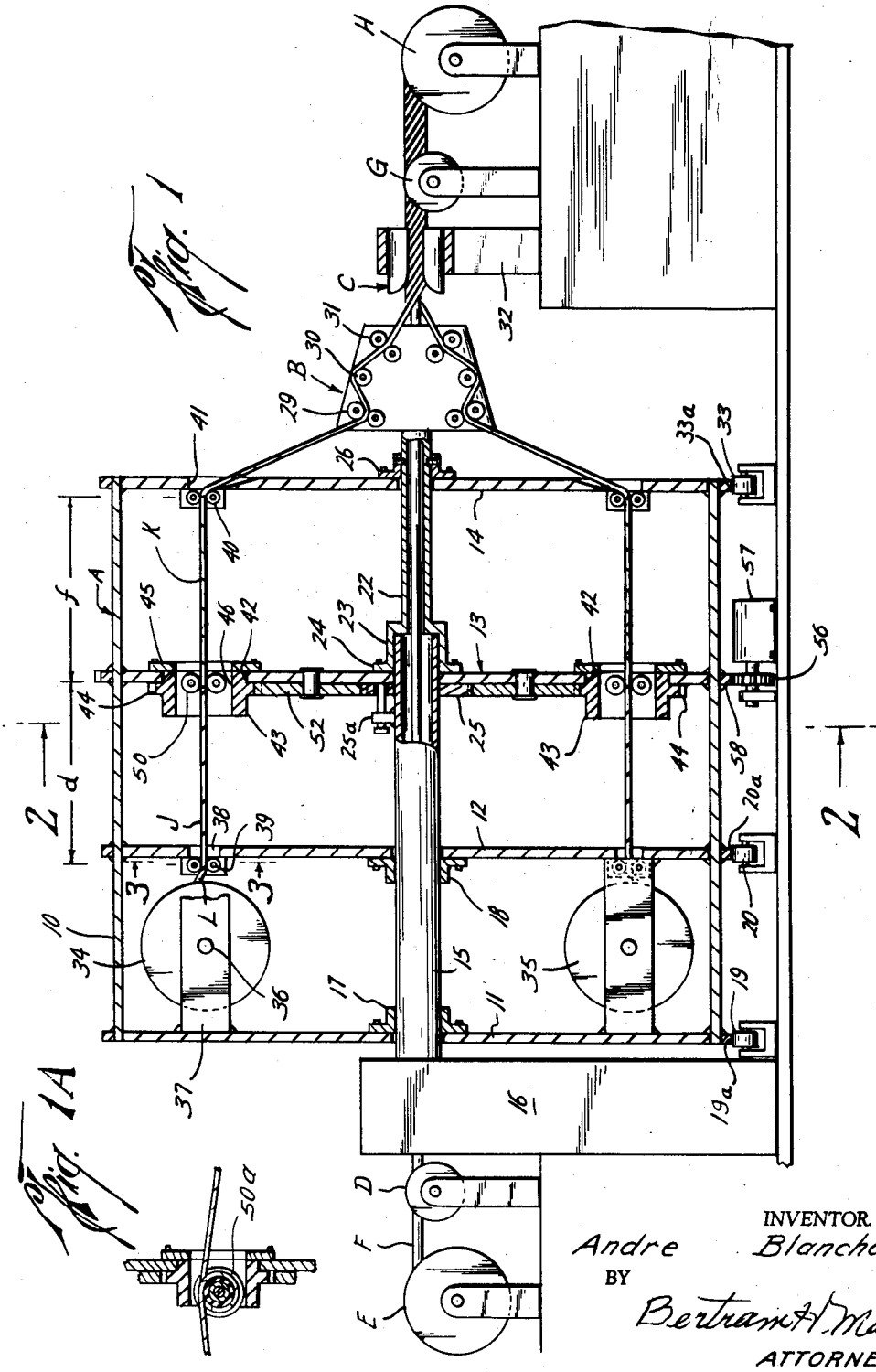

3,142,145
METHOD AND APPARATUS FOR FORMING CABLES
Andre Blanchard, Houston, Tex., assignor to Schlumberger Well Surveying Corporation, Houston, Tex., a corporation of Texas
Filed Jan. 28, 1963, Ser. No. 254,050
7 Claims. (Cl. 57—9)

This invention relates to apparatus and methods for forming cables and, more particularly, apparatus and methods for forming armored electrical cables wherein the armor strands have a non-circular cross-section.

In the manufacture of typical armored electrical cables, a core member containing insulated electrical conductors is enclosed by an inner layer of round armor wires laid spirally on the core member in one direction and an outer layer of round armor wires laid spirally on the inner armor layer in the opposite direction. The armoring apparatus typically includes a preforming head to form the armor wires before application to the cable from a straight line shape to a helical shape approximating the helical shape configuration the wire will have when it is finally in place in the cable. Such preforming makes the cable easier to handle and simplifies splicing of armor wires if necessary.

Also, in the typical armoring apparatus, the armor wires are supplied from spools to the preforming head, the spools being mounted on rotatable cradles in a rotatable cage housing. The cradles are rotatively manipulated relative to the cage housing by weights or gearing so as to maintain a constant orientation of the spools in space. Hence, there is no twist imparted to the respective wires between the spools and preforming head. However, it will be appreciated that the generatrix of contact between a wire and the core is a spiral path about each wire. For round wires, the fact that the generatrix of contact spirals around the wire is of no consequence. However, in the case of interfitted armor wires with a non-circular cross-section, the generatrix of contact must be parallel to the lengthwise axis of a wire so that the armor wires have a correct attitude along the length of the cable.

To provide the correct attitude for the application of non-circular cross-sectional armor wires to a core, it will be appreciated that the supply spools can be positively rotated relative to the cage to lay the armor wires on the core with a generatrix of contact parallel to the axis of the armor wire; however, by this operation each armor wire has been subjected to appriximately one turn of twist per lay distance when the lay angle is small, the lay distance being the distance required to lay one armor wire diagonally through 360° about the core. Such twisted wires are torsionally stressed and, thus, very "lively" when cut or broken. Hence, if such an armor wire breaks, there would be a spontaneous unwinding of the broken element. Obviously, such a cable could be a hazard in a well bore and is extremely difficult to splice.

Accordingly, an object of the present invention is to provide a novel apparatus and methods for helically laying armor wires with a non-circular cross-section on a cable core while removing torsional stresses from the armor wires.

Another object is to provide unitary cable forming equipment capable of forming and laying armor wires with a non-circular cross-section with a correct attitude with respect to the cable and in a neutral or unstressed condition.

The herein described apparatus consists, in general, of a rotatably mounted cage and for each armor wire, a supply spool, a twist guide and wire guides equidistantly spaced from one another about the cage axis. The twist guides are rotatable bodily about axes parallel to the cage axis for providing twists in opposite directions for the wire portions on opposite sides of the twist guides. The length of the upstream wire portions and the number of twists therein and the length of the downstream portion and number of reverse twists therein are adjusted so that the upstream portion of the wire is twisted beyond the elastic limit to keep a permanent turn of twist per lay or pitch distance after the downstream portion of the wire is reversely twisted. This remaining turn of permanent twist per lay is very nearly what is needed for laying the armor wire "dead" on a core.

The method of the present invention in connection with laying armor of non-circular cross-section on a central core support includes the steps of continuously twisting a first span of non-circular armor wire in one direction and a contiguous second span of such armor wire in an opposite direction a like number of turns with such first and second spans having different lengths so as to produce a higher torsional strain in the first span which results in a net permanent twist of a turn per lay distance in each armor wire and spirally applying such armor wires of non-circular cross-section to a central core support.

In the accompanying drawings which illustrate the invention,

FIG. 1 is a schematic side view and section showing the novel apparatus;

FIG. 1a is a partial illustration of another embodiment of the present invention;

FIG. 2 is an enlarged sectional view taken substantially on line 2—2 of FIG. 1;

FIG. 3 is a detail section taken substantially on line 3—3 of FIG. 1;

FIGS. 4 and 5 are sectional views representing non-circular types of armor wires.

Referring now to FIGS. 1 and 2, a cage, generally designated A, has longitudinal bars or plates 10 connected to a series of transverse circular, partition members, generally designated 11, 12, 13 and 14. A stationarily mounted tubular journal member 15 projects axially through the partition members 11, 12, 13 and has an outer end attached to a stationary journal support 16 positioned just leftwardly of the cage. Partition members 11 and 12, respectively, have central bearing sleeves 17 and 18 for rotatably mounting the partition members and cage on the journal 15. Additional rotative mounting for the cage may be provided in the form of external roller bearings 19, 20 and 33 and annular rings 19a, 20a, 33a on the outside of the cage.

A tubular spindle 22 projects axially through the partition member 14 and has an enlarged portion 23 at its left end rotatably received upon the right extremity of journal 15. Spindle 22 has a flange 24 attached to intermediate partition member 13 and a collar 26 attaches the spindle 22 to partition member 14.

Aligned with intermediate partition member 13 and beneath cage A is a driving pinion 56 operated by a motor 57 and meshing with external annular gear ring 58 on cage A. The arrangement is such that, upon energization of motor 57, cage A, including partitions 11, 12, 13 and 14 and spindle 22 are rotated.

A helical preforming head B is attached to an end of the spindle 22 which extends outwardly from the cage. The head B, shown proportionally exaggerated, has staggered guide rollers 29, 30 and 31 for each armor wire. To the right of the preforming head B, a closing die member C is mounted on a stationary support 32. At the left-hand end of the cage there is provided a payout capstan D and a supply reel E for a core F. At the right-hand side of forming die C there is provided a draw-off capstan G and a storage reel H for the finished cable.

For convenience, only two spools 34 and 35 are shown to provide armor wires, although it is understood that a sufficient number of these spools are equidistantly spaced about the cage axis to fully armor the cable. Each supply spool is rotatably mounted by means of a shaft 36 journaled in support members 37 which are connected to transverse parition members 11 and 12.

Partition member 12 has openings 38 aligned with each spool shaft 36. Roller guides 39 with axes parallel to the axis shaft 36 are mounted on partition member 12 adjacent an opening 38. Similar pairs of roller guides 40 are mounted on partition member 14 adjacent openings 41 in the member 14, guides 40 being in alignment with guides 39.

Central partition member 13 has circular openings 42 arranged equidistantly spaced from the central axis of the cage, each opening being axially aligned with respect to openings 38 and 41. Rotatably received within each opening 42 is a circular body 43 with an external spur gear 44 and retaining flange 45 respectively positioned on either side of the partition 13 to hold body 43 on the partition. Suitable bearing structure may be provided in opening 42, if desired. Each body 43 has an opening 46 in which are journaled the twist roller guides 50. Roller guides 50, 39, 40 are aligned so that a wire may be passed therebetween in a straight line. An idler gear 52 is rotatably mounted on partition member 13 between each spur gear 44. A gear 25 is rotatably mounted on journal 15 and selectively operable lock mechanism 25a is provided for coupling the gear 25 to journal 15. Gears 25, 52 and 44, preferably, are arranged in a well-known manner so that each body 43 (and twist guides 50) can be rotated about an axis through the center of a cable section, the axis being parallel to the axis of cage A.

As shown in FIG. 2, a gear pinion 54 is mounted on partition 13 and meshes with gear 44. Pinion 54 is provided with a removable hand crank 55, the gear 54 permitting manual rotation of the cage and twist guides 50 through the planetary gear set 25, 52, 44. A lock mechanism 54a is associated with gear 54 to lock the gear when desired.

FIG. 4 illustrates the armoring wires 60 of trapezoidal section (spaced apart for illustration) which can be laid on a core to form a smooth outer surface on the armor. In FIG. 5, there is shown (spaced apart for illustration) semi-locked armor wires 61 for a cable. In both cases, it is necessary that the armor wires remain always in the same attitude with respect to the cable. That is, the surface shaped to fit the core should be applied against the core, the surface meant to face outward should do so, and the surface or surfaces shaped to fit the adjoining strands should do so all along the length of the cable.

In operation, each supply spool provides a non-circular armor wire of preselected shape, the wire passing sequentially through upstream roller guide 39, opening 38 in partition 12 to twist guides 50. The wire then passes through downstream roller guide 40 and opening 41 in partition 14. Each wire is then fed through appropriate helix forming guides of the forming head B and laid on the cable while passing through the closing die C to draw-off capstan G and storage reel H. The inner core F is fed from storage spool E, around feed capstan D, then through journal 15, spindle 22 and an opening through head B and to closing die C with the applied armor wires.

To provide a permanent turn of twist per lay distance, the crank 55 is operated to twist the wire portions J and K between roller guides 39, 50 and guides 50, 40 by rotating twist guides 50 about the axis of the cable section. At this time lock mechanism 25a is disconnected. It will be appreciated that the cross-section of the opening between a pair of roller guides is complementary to the cross-section of the wire so that such rotation puts +N (N equals number of turns) in the wire in a distance $d$ (distance between roller guides 39, 50) and —N turns in the wire in distance $f$ (distance between twist guides 50 and roller guides 40). Distance $d$ is made shorter than distance $f$, the distance $d$ and number of turns N being interrelated to torsionally strain the wire so that it will result in a preformed armor wire as it exits from guides 41 having a permanent turn of twist per lay distance. Crank 55 is then locked in position. As the wires are pulled through guides 50 and 38, the number of twists remains constant. Similarly, the number of twists between twist guides 50 and guides 41 remains constant. The wires as it is passed to the preforming head B is not twisted, but its neutral or unstressed condition has been changed to have a permanent turn of twist per lay distance. Therefore, the wire will be in a torsionally neutral condition around the cable core. It should be appreciated that while a permanent turn of twist has been discussed, the precise permanent turn amount is determined by the elasticity of the wire material as well as other factors which are apparent to one skilled in the art.

Therefore, it will be appreciated that planetary gearing 25, 52, 44 is initially utilized to twist the portions of the particular armor strand on the opposite sides of the twist guides 50 an amount that will result in a residual twist above the elastic limit of the wire under unrestrained conditions of one permanent turn of twist per pitch or lay distance. The wire portions J are twisted in the same direction as the cage rotation, while the wire portions K are twisted in a direction opposite to the cage rotation. After imparting the twist to the armor wire, the guides 39, 40 and 50 which thereafter remain stationary relative to the cage will confine twisting to the wire lengths J and K.

In the foregoing described method and apparatus, the wire is confined by the shaped opening of the twist guides 50 as it passes therethrough. However, if the wire has a more symmetrical cross-section, it can be passed over a twist pulley in a twisted form. In this case, as shown in FIG. 1a, the roller guides 50 can be eliminated and pulleys 50a made of or covered with a deformable material such as rubber substituted. With the twisted wire continually passing over the pulleys 50a, it is necessary to continually add twists to the wire. This additional twist is added by locking the planetary gear 25 to journal 15 with lock mechanism 25a so that pulleys 50a are constantly rotated and add additional twist to the wire for the twist removed while passing over pulley 50a.

The number, shape and size of the affected armor wires may be varied and the shape of the armor wires will determine whether or not it is necessary or advisable to use rotating pulleys 50a or fixed guides 50. The number of feed spools, pulleys, and guide roller groups will conform to the number of armor wires to be laid. Moreover, the means for obtaining rotation of pulleys 50, etc. relative to cage A may be varied. The invention may be modified in these and other respects as will occur to those skilled in the art, and the exclusive use of all modifications as come within the scope of the appended claims is contemplated.

I claim:

1. Means for pretwisting non-circular wire preparatory to cabling comprising: case means, first, second and third longitudinally spaced means mounted on said cage means for guiding a non-circular wire therethrough with a given attitude with respect to said cage means, said second spaced means being disposed intermediate of said first and third spaced means, means for rotating said second spaced means about its axis relative to said first and third spaced means to twist wire portions to either side of said second spaced means in opposite directions a like number of turns, said second spaced means being spaced at different distances with respect to said first and second spaced means so that twisting of such wire portions provides a permanent turn of twist in a wire for a given length upon emergence of a wire from said third spaced means.

2. The apparatus of claim 1 and further including means for releasably locking said second spaced means relative to said first and third spaced means.

3. Apparatus for pretwisting non-circular wire preparatory to cabling comprising: cage means, longitudinally spaced guide means on said cage means, twist guide means disposed on said cage means between said guide means for guiding wire therethrough, said twist guide means being spaced at different distances with respect to said spaced guide means, said guide means being shaped to the cross-section of a wire to be passed therethrough, means mounting said twist guide means for rotation of said twist guide means about its axis relative to said spaced guide means, means for rotating said twist guide means about its axis for respectively twisting in opposite directions the portions of wire between said twist guide means and said other guide means to orient the attitude of a wire and provide a permanent turn of twist in a wire for a given distance upon emergence from the last guide means, and means for selectively locking said twist guide means relative to said spaced guide means.

4. Apparatus for laying one or more wires of non-circular section helically upon a cable core member with a generatrix of contact parallel to the longitudinal axis of each wire comprising: cage means mounted for rotation about a central axis, a plurality of storage reels fixedly secured on said cage, wire preforming means on said cage including wire guide means disposed at different distances to either side of twist guide means, said guide means being shaped to conform to the cross-section of the wire, means for rotating said twist guide means relative to said wire guide means for providing turns of twist in a wire section in opposite directions on either side of said twist guide means and to provide a permanent turn of twist in a wire section over a given distance upon emergence from the last guide means, means for securing said twist guide means in a rotative position, and means for rotating said cage for helically laying wire on a core member.

5. The method of prestressing a non-circular wire for helical laying about a cable core with the generatrix of contact for the wire remaining parallel to the lengthwise axis of the wire which method comprises: twisting a wire in opposite directions between two spaced locations to obtain a permanent turn of twist in one direction per lay distance in wire passed through said spaced locations, maintaining the twisted orientation of such wire between such locations, and spirally applying the wire to a cable core.

6. A method of laying armor of non-circular cross-section on a central core support including the steps of: continuously twisting a first span of non-circular armor wire in one direction and a contiguous second span of such armor wire in an opposite direction a like number of turns with such first and second spans having different lengths so as to produce a higher torsional strain in the first span which results in a net permanent twist per lay distance in each armor wire, and removing said net permanent twist by spirally applying such armor wires of non-circular cross-section to a central core support with the generatrix of contact for a wire remaining parallel to the lengthwise axis of a wire.

7. A method of laying armor of non-circular cross-section on a central core support including the steps of: continuously twisting a first span of non-circular armor wire in one direction and a contiguous sesond span of such armor wire in an opposite direction a number of turns related to the length of such first and second spans so as to produce a higher torsional strain in one of said spans which results in a net permanent twist in one direction per lay distance of the wire, and removing said net permanent twist by spirally applying such armor wires of non-circular cross-section to a central core support with the generatrix of contact for a wire remaining parallel to the lengthwise axis of a wire.

References Cited in the file of this patent

UNITED STATES PATENTS

| | | |
|---|---|---|
| 1,808,444 | Zapf | June 2, 1931 |
| 1,818,845 | Fessl | Aug. 11, 1931 |
| 3,025,656 | Cook | Mar. 20, 1962 |

FOREIGN PATENTS

| | | |
|---|---|---|
| 384,897 | Great Britain | Dec. 15, 1932 |
| 796,186 | Great Britain | June 4, 1958 |